United States Patent

Lau

Patent Number: 5,842,782
Date of Patent: Dec. 1, 1998

[54] SCREW CONVEYOR-TYPE DELIVERY AND MIXING DEVICE FOR PLASTICS INJECTING MOLDING MACHINE

[75] Inventor: Anderson Lau, Changhua Hsien, Taiwan

[73] Assignee: Wahn-An Machine Produce Co., Ltd., Changhua Hsien, Taiwan

[21] Appl. No.: 856,593

[22] Filed: May 15, 1997

[51] Int. Cl.$^6$ .................................................. B01F 7/08
[52] U.S. Cl. ............................ 366/85; 366/321; 366/301
[58] Field of Search .................................. 366/83, 84, 85, 366/88, 292, 297, 298, 299, 300, 301, 321; 425/204, 209

[56] References Cited

U.S. PATENT DOCUMENTS

| | | | |
|---|---|---|---|
| 2,509,379 | 5/1950 | Vasel | 366/301 |
| 2,581,451 | 1/1952 | Sennet | 366/85 |
| 2,802,238 | 8/1957 | Colombo | 366/85 |
| 3,310,837 | 3/1967 | Wittrock | 366/85 |
| 3,804,382 | 4/1974 | Pultz | 366/84 |
| 4,192,617 | 3/1980 | Spielhoff | 366/301 |
| 4,846,054 | 7/1989 | Mange et al. | 366/84 |
| 4,889,430 | 12/1989 | Mueller | 366/85 |
| 5,106,198 | 4/1992 | Muller | 425/204 |
| 5,139,806 | 8/1992 | Hauser et al. | 425/204 |

*Primary Examiner*—Tony G. Soohoo
*Attorney, Agent, or Firm*—Browdy and Neimark

[57] ABSTRACT

A screw conveyor type delivering and mixing device is for combinational use on a plastics injection molding machine. The screw conveyor type delivering and mixing device comprises a large central screw rod and two small side screw rods that are housed in a delivering tube having a material feeding opening at one end. The delivering tube has a large central tubular portion for accommodation of the large central screw rod and two small tubular side portions for housing the two small side screw rods. The central tubular portion communicates with the two tubular side portions along the full axial length thereof. All the screw rods have sections alternatively having coarse threads, fine threads and medium threads consecutively with different pitches. The screw rods housed in the delivering tube are reversely driven to rotate with the threads of the large central screw rod in mesh with those of the small side screw rods so as not only to deliver plastic materials but also to crash and mix the same at different temperatures along the delivering tube.

3 Claims, 2 Drawing Sheets

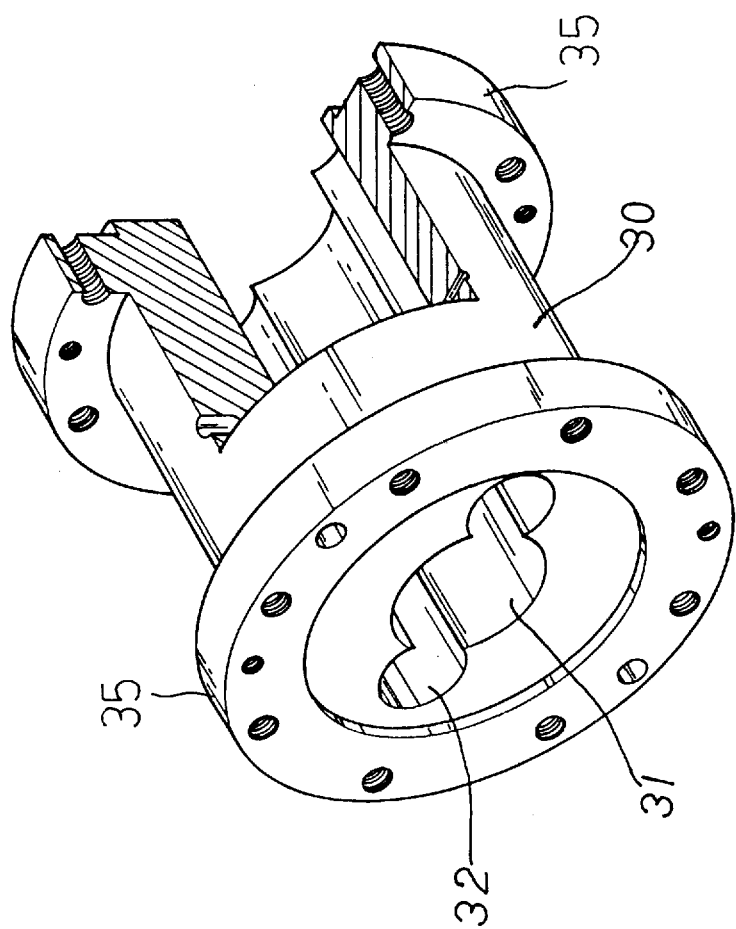

SCREW CONVEYOR-TYPE DELIVERY AND MIXING DEVICE FOR PLASTICS INJECTING MOLDING MACHINE

BACKGROUND OF THE INVENTION

The present invention relates to a screw conveyor type delivering and mixing device for combinational use on a plastics injection molding machine. The screw conveyor type delivering and mixing device comprises a large central screw rod and two small side screw rods that are housed in a delivering tube having a material feeding opening at one end. The delivering tube has a large central tubular portion for accommodation of the large central screw rod and two small tubular side portions for housing the two small side screw rods. The central tubular portion communicates with the two tubular side portions along the full axial length thereof. All the screw rods have sections alternatively having coarse threads, fine threads and medium threads consecutively with different pitches. The screw rods housed in the delivering tube are reversely driven to rotate with the threads of the large central screw rod in mesh with those of the small side screw rods so as not only to deliver plastic materials but also to crash and six the same at different temperatures at different sections along the delivering tube.

Conventional screw conveyor for use on a plastics injection molding machine uses only one screw rod to transmit raw plastic material without mixing and crushing the material during delivery. This provides plastic injection materials of very poor quality. Moreover, the raw material can not be fed in a powder form and must be converted into grains for delivery.

An improved screw conveyor delivering device is designed to have two reversely rotated screw rods to both deliver and crush plastic grains. Such device provides plastic mixture with improved quality in one aspect, and plastic powder can also the delivered in another aspect. In comparison, various PVC materials can still not be effectively mixed with the prior art delivering device.

SUMMARY OF THE INVENTION

The primary object of the present invention is to provide a screw conveyor type delivering and mixing device for in combination with a plastics injection molding machine which is equipped with a large central screw rod and two small side screw rods housed in a delivering tube having a central tubular portion and two small side tubular portions. Each of the screw rods is divided into several sections having different coarse, medium and fine threads and pitches which are driven with the two small rods rotated in a reverse direction with respect to the large rod so as plastic material delivered in the delivering tube can be crushed, pressed and mixed in a smooth manner.

Another object of the present invention is to provide a screw conveyor type delivering and mixing device in which raw plastic powder can be fed directly without the problem of processing the power material into grains in advance.

One further object of the present invention is to provide a screw conveyor type delivering and mixing device in which various kinds of PVC materials can be fed for crushing and mixing.

One still further object of the present invention is to provide a screw conveyor type delivery and mixing device which is equipped with a heating means which can provide heat to different sections of the delivering tube to keep the sections working at desired temperatures respectively.

BRIEF DESCRIPTION OF THE DRAWINGS

FIG. 2 is a perspective diagram showing the tube unit of the material delivering tube.

DETAILED DESCRIPTION OF THE PREFERRED EMBODIMENT

Figures 1, 1A:
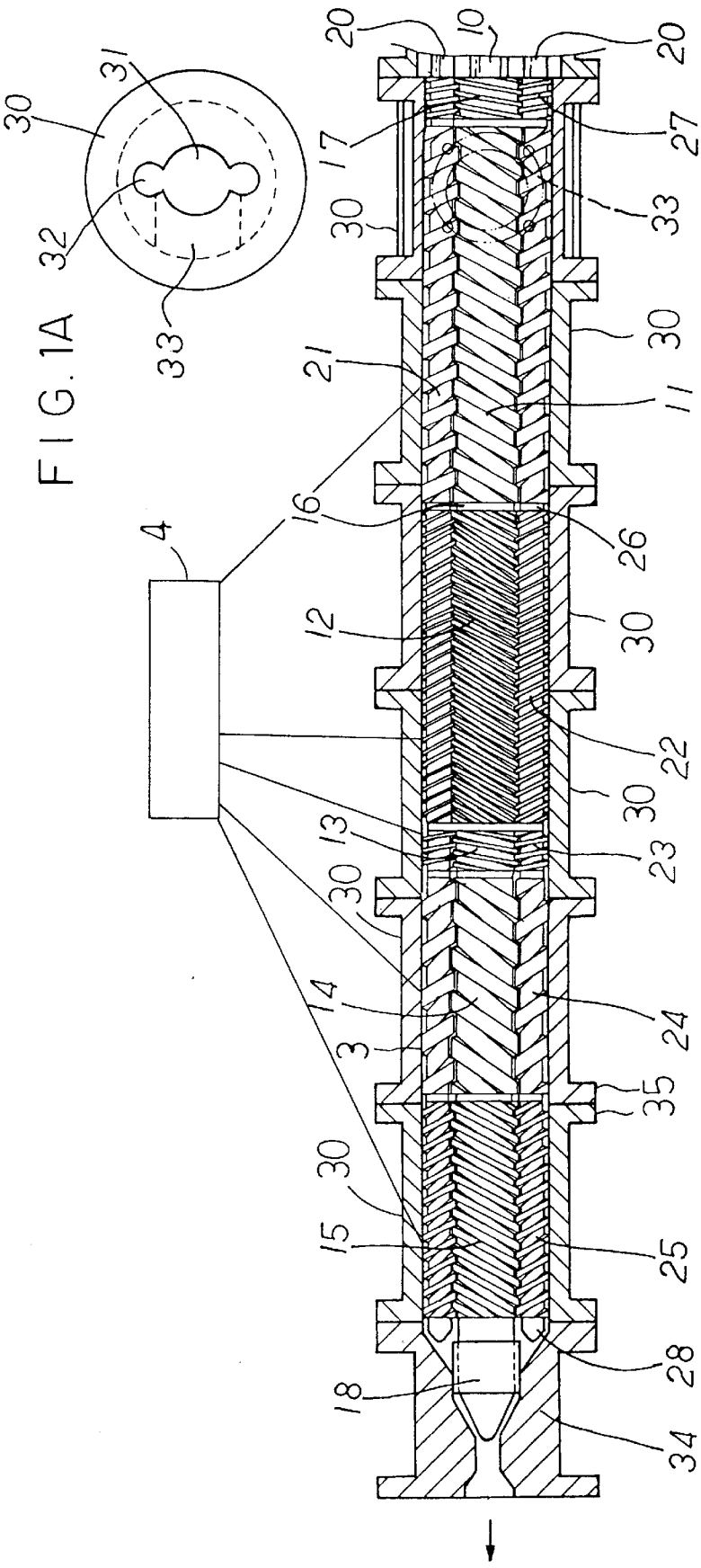
FIG. 1 is a sectional view of the assembly of the screw conveyor plastics delivering and mixing device for plastics injection molding machine of the present invention.
FIG. 1A is a front view of the assembled tube units of the material delivering tube.

Referring to FIG. 1, the sectional diagram of the assembly of the present invention is illustrated. It mainly comprises a large central screw rod 10 and two symmetric small side screw rods 20. The three rods 10, 20 start from transmission terminals and then each is formed into a coarsely threaded feeding section 11, 21 having the largest pitches on the rods, and next extend into a finely threaded squeezing section 12, 22 having relatively smallest threads and pitches on the rods. This section is then engaged to a buffer section 13, 23; The rods are then formed into another coarsely threaded mixing section 14, 24, which is the same as the feeding section 11, 21, and finally into a mediumly threaded controlling section 15, 25 having medium-sized threads and pitches.

The threads or teeth of the three screw rods 10, 20 are in mesh with one another at each section thereof. Between the intersection of every two of the above cited sections of each screw rod 10, 20 a smooth blank section 16, 26 is formed. At the right end of the screw rods 10, 20 an engagement section 17, 27 is provided for power transmission purposes. At the left end of the screw rods 10, 20 is disposed a pointed plasticizing section 18, 28 respectively through which melted plastics flows into an injection molding machine.

Referring to FIG. 2, a basic delivery tube unit 30 each has a circular flange 35 at one end thereof and can be joined together end to end to form the delivery tube 3 as shown in FIG. 3. Each tube unit 30 is provided with a large central tubular portion 31 corresponding to the large central screw rod 10 and two small side tubular portions 32 corresponding to the two small side screw rods 20. The two small side tubular portions 32 are in communication with the large central tubular portion 31 axially along the full length of delivery tube 3 and each unit 30. The delivery tube 3 accommodates the three screw rods 10, 20 with the threads or teeth of the screw rods 10 in mesh with those of the screw rod 20 respectively.

As shown in FIG. 1A, the first base tube unit 30 disposed at the beginning of the feeding section 11, 21 of the delivery tube 3 is provided with a side opening 33 for feeding raw plastic material into the delivering tube 3. The pointed plasticizing sections 18, 28 defined at the leftmost ends of the screw rods 10, 20 are engaged with a melting sleeve 34 disposed at the end of the delivery tube 3.

Furthermore, a heating means 4 in operational association with each section of the delivery tube 3 serves to supply heat thereto so as to keep the different sections working at various temperatures.

When PVC powder or grains are fed into the material delivery tube 3 via the side opening 33, power is supplied to the screw rods 10, 20 respectively by way of the engagement sections 17, 27 in such a manner that the screw rods 10 and the screw rod 20 are rotated in opposite directions whereby plastic powdered or grains transmitted in the delivery tube 3 will be crushed and mixed between the rotating rods during in delivery. Besides, at different sections of the delivery tube 3 the plastic powder or grains are heated at various temperatures to melt, as preceedingly described.

The feeding section 11, 21, the mixing section 12, 22, and the minutely controlling section 15, 25, are heated up at the temperature of 175° C.; and the mixing section 12, 22 and the buffer section 13, 23 are heated up at the temperature of 180° C. to get the plastic powder or grains to melt.

It can be clearly seen that the screw rods of the screw conveyor device of the present invention are provided with sections of different pitches and kinds of threads or teeth and are driven to rotate in opposite directions and each section of the delivery tube is controllably heated up at different temperatures so as to produce various extent of crushing, squeezing effects in such a manner that plastic material is smoothly and completely mixed. Besides, plastic powder can be fed into the delivery tube directly without the trouble of getting the powder into grains form in one aspect; and different kinds of PVC materials can be squeezed and mixed directly in another aspect, greatly facilitating the mixing of all kinds of plastic materials for plastics injection molding operations.

I claim:

1. A screw conveyor type delivery and mixing device for use with a plastics injection molding machine, comprising;

a delivery tube having a material feeding opening at a first end for receiving raw plastic material;

a large central screw rod;

a plurality of small side screw rods rotationally engaged with said large central screw rod;

said large central screw rod and said small side screw rods being housed in said delivery tube;

said large central screw rod and said small side screw rods having sections along a longitudinal length thereof, each consecutive section of said sections having different corresponding threads and pitches;

said large central screw rod and said plurality of small side screw rods each having an engagement end permitting said central screw rod to oppositely rotate said small side screw rods when said large central screw rod is rotated by an external power;

said threads of said central screw rod being in mesh with said threads of said small screw rods at each of said sections;

said delivery tube having a large central tubular portion corresponding to said large central screw rod and a plurality of small tubular portions respectively corresponding to said small side screw rods;

said large central tubular portion communicating with each said small tubular portion along a full axial length thereof;

a heating means in operational association with said delivery tube at said selected sections of said large central screw rod and said small sides screw rods so as to keep said sections working at a desired temperatures;

after said engagement end, said large central screw rod and said two small side screw rods being engaged together at an engagement section, and having a blank section, a coarsely threaded feeding section with large pitches, a blank section, a finely threaded squeezing section with small pitches, a blank section, and a mediumly threaded buffer section with medium pitches, a blank section, a coarsely threaded mixing section, a blank section, a mediumly threaded controlling section with medium pitches;

said large central screw rod and said small side screw rods terminating at a pointed head housed in a plasticizing sleeve disposed at a second end of said delivery tube, through which melted plastic material is injected whereby raw plastic powder or grains can be delivered, crushed, and mixed evenly and effectively delivered along the delivery tube from said first end thereof to said second end.

2. The delivery and mixing device as claimed in claim 1 wherein said delivery tube comprises a plurality of tube units having a circular flange at one end thereof whereby said tube units can be joined end to end to form said delivery tube.

3. The delivery and mixing device as claimed in claim 1 wherein said coarsely threaded feeding section, said mixing section and said minutely controlling section can be heated by said heating means up to a temperature of 175° C. and said squeezing section and buffer section can be heated by said heating means up to a temperature of 180° C. whereby plastic powder or grains can be effectively melted and crushed and mixed.

* * * * *